(12) United States Patent
Kifuku et al.

(10) Patent No.: US 6,711,484 B2
(45) Date of Patent: Mar. 23, 2004

(54) ELECTRIC POWER STEERING CONTROL SYSTEM

(75) Inventors: Takayuki Kifuku, Tokyo (JP); Seiji Sakanishi, Tokyo (JP); Sadaaki Kamei, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/121,700

(22) Filed: Apr. 15, 2002

(65) Prior Publication Data

US 2003/0069675 A1 Apr. 10, 2003

(30) Foreign Application Priority Data

Oct. 10, 2001 (JP) .................... P2001-312852

(51) Int. Cl.⁷ ................................. B62D 5/04
(52) U.S. Cl. ................. 701/41; 180/443; 318/434
(58) Field of Search ............... 701/41, 42, 43; 180/79.1, 142, 141, 143, 133, 446, 444, 445, 443; 318/434; 307/10.1

(56) References Cited

U.S. PATENT DOCUMENTS

| 4,715,463 A | * | 12/1987 | Shimizu ............ 180/79.1 |
| 4,753,309 A | * | 6/1988 | Marumoto et al. ...... 180/79.1 |
| 5,861,725 A | * | 1/1999 | Endo et al. ........... 318/434 |
| 6,148,948 A | * | 11/2000 | Shimizu et al. ........ 180/446 |
| 2002/0019690 A1 | * | 2/2002 | Kurishige et al. ........ 701/41 |
| 2002/0057015 A1 | * | 5/2002 | Kikuta et al. ......... 307/10.1 |

FOREIGN PATENT DOCUMENTS

| JP | 2-34469 | 2/1990 |
| JP | 3-227768 | 10/1991 |
| JP | 10-291481 | 11/1998 |
| JP | 2962683 | 8/1999 |

* cited by examiner

Primary Examiner—Thomas G. Black
Assistant Examiner—Tuan C To
(74) Attorney, Agent, or Firm—Sughrue Mion, PLLC

(57) ABSTRACT

In the conventional electric power steering control system, a gain by which an approximate differentiation value of a torque signal is multiplied comes to be large at high speed driving. Therefore, a problem exits in that unstable feel of steering increases, thereby steering convergence getting worse. An electric power steering control system includes a variable type torque differential operation device 104A that makes variable a differential time constant at the time of outputting a second motor current, and a time constant determining device 105X that commands the time constant to the variable type torque differential operation device 104A. The time constant determining device 105X determines the time constant in response to any change in not less than one signal selected and used in an arbitrary manner out of a speed signal 81, a torque signal 82, a yaw rate signal 83 and a steering rate signal 84.

10 Claims, 13 Drawing Sheets

ELECTRIC POWER STEERING CONTROL SYSTEM

BACKGROUND OF THE INVENTION

1. Technical Field

The present invention relates to an electric power steering control system for controlling an electric power steering apparatus of an automobile and the like.

2. Background Art

In an electric power steering apparatus assisting a force required for a driver who manipulates a steering wheel of a vehicle, by means of an electric motor, it is very important that the electric motor is controlled so as to obtain an appropriate manipulation feeling of the steering wheel. Various electric power steering control systems for carrying out such control have been proposed up to now.

FIG. 11 is relevant to a block diagram of a conventional electric power steering control system shown in the Japanese Patent Publication (unexamined) No. 34469/1990. In addition, for the help of better understanding, FIG. 15 shows a construction of a generally known electric power steering apparatus. In FIG. 15, reference numeral 1 designates a steering wheel, and numeral 2 designates a torque sensor mounted on a shaft of the steering wheel. Numeral 10 designates a running wheel, and numeral 11 designates a gear mechanism that transmits a manipulation force of the steering wheel 1 to an angle control mechanism 12 of the running wheel 10.

In FIG. 11, numeral 2 designates a torque sensor mounted on the shaft of the steering wheel (numeral 1 in FIG. 15) for detecting the steering force of the driver. Numeral 3 designates a vehicle speed sensor for detecting a travelling speed of the vehicle (hereinafter referred to as a vehicle speed). Numeral 6 designates an electric motor (hereinafter referred to as a motor) for applying a steering assist force (hereinafter referred to as a steering assist amount or an assist force) to the shaft of the steering wheel (hereinafter referred to as a steering shaft). Numeral 7 designates a controller for computing the steering assist amount in response to a signal of the mentioned torque sensor 2 and vehicle speed sensor 3, and driving the motor 6.

Next, operation of the controller 7 is described. First motor current determining means 101 determines a first motor current based on an output of the torque sensor 2 and an output of the vehicle speed sensor 3, for example, based on a characteristic shown in FIG. 12. In FIG. 12, a motor current (approximate to a motor torque) is set so as to be generated when the steering torque exceeds a predetermined level, and further determined so as to be larger as the vehicle speed reduces.

A second motor determining means 102 approximately differentiates an output signal from the mentioned torque sensor 2 by torque differential operation means 104. The second motor determining means 102 multiplies the approximately differentiated value of the torque sensor output by a gain determined on the basis of the vehicle speed detected by the vehicle speed sensor 3. For example, as shown in FIG. 13, the greater the vehicle speed, the larger the gain is. Thus, the second motor current determining means 102 determines the second motor current in accordance with the characteristic as shown in FIG. 13. In case of FIG. 13, the motor current to be generated is in proportion to a rate of change of the steering torque (torque differentiation), and further determined so as to be larger as the vehicle speed becomes higher.

The above-described first motor current value and second motor current value are added together by an adder 30. By setting this addition value as a target current to be passed through the motor 6, the motor 6 is driven at a constant current by motor drive means 103.

In this manner, in the mentioned conventional electric power steering control system, the first motor current determining means 101 causes the torque to be generated for assisting the steering force of the driver. Further, the second motor current determining means 102 acts so as to cancel any effect due to inertial moment of the motor (i.e., a feeling of the driver that he feels the inertial moment of the motor as a weight when manipulating the steering wheel). As a result, the steering feeling will be improved.

Furthermore, when driving at a so high speed that the inertial moment of the motor 6 brings about any problem, the second motor current determining means 102 causes the gain, by which the above-described approximately differentiated value of the torque sensor is multiplied, to be large. On the other hand, when driving at a so low speed that the torque control system becomes unstable due to the second motor current and there is a possibility that the steering torque becomes vibrating, the second motor current determining means 102 causes the above-described gain to be small. In this respect, it is certain that, to prevent deterioration in feeling due to the motor inertia, the gain must be large enough. But, when the gain is too large, the gain by which the approximate differentiated value of the torque sensor is multiplied comes to be excessively large at a high speed travelling. Therefore, upon carrying out a quick steering such as lane change or avoidance of danger, the above-described second motor current comes to be exceedingly large thereby inducing the so-called deterioration in convergence such as an unstable feel of the steering wheel. Thus it is not always easy to adjust the gain.

Causes for producing the mentioned problems is hereinafter discussed further in detail. FIG. 13 is an example of the motor current determined by the second motor current determining means 102 as described above. FIG. 13 shows that the second motor current Idiff is calculated by multiplying together the mentioned approximate differentiation value of the torque and the above-described gain based on the vehicle speed. However, there is a time constant in this differential operation. Therefore, even after the driver loosens his grip on the steering wheel, (for extreme example, after the driver releases the steering wheel) thereby steering torque coming to be a value of nearly 0, the second motor current Idiff does not become 0 during a time in response to the time constant of the approximate differentiation of the torque. Accordingly, the current is still applied to the motor 6. In the case that this time constant is too long, the convergence of the vehicle gets worse, for example, at the time of lane change during driving at a high speed.

In the characteristic in FIG. 13, to prevent the steering feeling from getting worse due to the inertial moment of the motor 6 at a high speed travelling as described above, the above-described gain is set to be higher than that at a low speed. Such a setting means that the higher the speed, the larger the motor current flowing after the steering force is 0, and that the above-discussed convergence is induced to be getting worse.

To prevent such a condition, for example, on the contrary to the setting in FIG. 13, when setting the characteristic so that the gain reduces at a high speed, it becomes impossible to cancel the effect due to the motor inertial moment at a high speed travelling. As a result, the steering feeling gets worse. In this manner, there is a limit in controlling the steering feeling only by the gain, that is, by the adjustment of the inclination in FIG. 13.

To overcome such problems, the Japanese Patent Publication (unexamined) No. 157636/1998 discloses another construction of the electric power steering control system. FIG. 14 shows a construction similar to that disclosed in this patent publication.

In the known control system of FIG. 14, by means of a phase compensator 110, the approximately differentiated value of the torque sensor 2 is subject to a phase-compensation (so that frequency characteristic is improved, and a signal of an unnecessary frequency component of the approximately differentiated value is attenuated). The phase-compensated value is inputted to the second motor current determining means 102, and then in the same manner as in the foregoing conventional example in FIG. 11, the second motor current is computed. Addition of such a phase compensation circuit requires addition of any analog electronic circuit or digital circuit that requires extra software, eventually resulting in lowering of processing speed due to complicated processing.

In the conventional electric power steering control system of above-described arrangement, the gain becomes large by which gain the approximately differentiated value of the torque sensor is multiplied in travelling at a high speed. Accordingly, a problem exists in that the second motor current becomes excessively large at the time of carrying out a quick steering such as lane change or avoidance of danger thereby causing the so-called deterioration in convergence such as unstable feeling of the steering wheel.

Moreover, to overcome the mentioned problem concerning the convergence at a high speed travelling, on the contrary to the above-described conventional example, it was attempted to set the characteristic so that the gain, by which the approximately differentiated value of the torque sensor is multiplied at a high speed travelling, becomes small. In this attempt, however, another problem exists in that the inertial moment of the motor is not sufficiently compensated, eventually resulting in deterioration in steering feeling.

Furthermore, the other conventional system intending to solve the problem incidental to the conventional system by phase compensation requires a phase compensator. Thus, a problem exists in that addition of the electronic circuit is required in the case of the analog circuit forming such a phase compensator. Further, a problem exists in that in the case of employing a microprocessor serving as the phase compensator, since operation amount (i.e., volume to be computed) increases, an expensive microprocessor for carrying out the computing operation at a high speed is required resulting in a high cost.

SUMMARY OF THE INVENTION

The present invention has an object of providing an electric power steering control system in which, without increasing operation amount, convergence and steering feeling at a high speed driving are both improved while maintaining a light steering feeling at a low and medium speed driving, thereby securing a comfortable steering feeling.

For the purpose of obtaining an optimum steering feeling in response to the state of the vehicle, an electric power steering control system according to the invention is mounted on a vehicle that includes a steering apparatus, a torque sensor for detecting a steering force, a motor for assisting the steering force, and includes time constant variable type torque differential operation unit having a differential function for differentiating the output signal of the mentioned torque sensor and capable of setting a differential time constant of the mentioned differential function to a command time constant, and time constant determining unit for determining the differential time constant in response to a state quantity for the steering and commanding the differential time constant to the time constant variable type torque differential unit.

As a result, the electric power steering control system according to the invention has a comfortable steering feeling.

The foregoing and other object, feature, aspects and advantages of the present invention will become more apparent from the following detailed description of the present invention when taken in conjunction with the accompanying drawings.

DESCRIPTION OF THE PREFERRED EMBODIMENTS

Embodiment 1.

Figure 1:
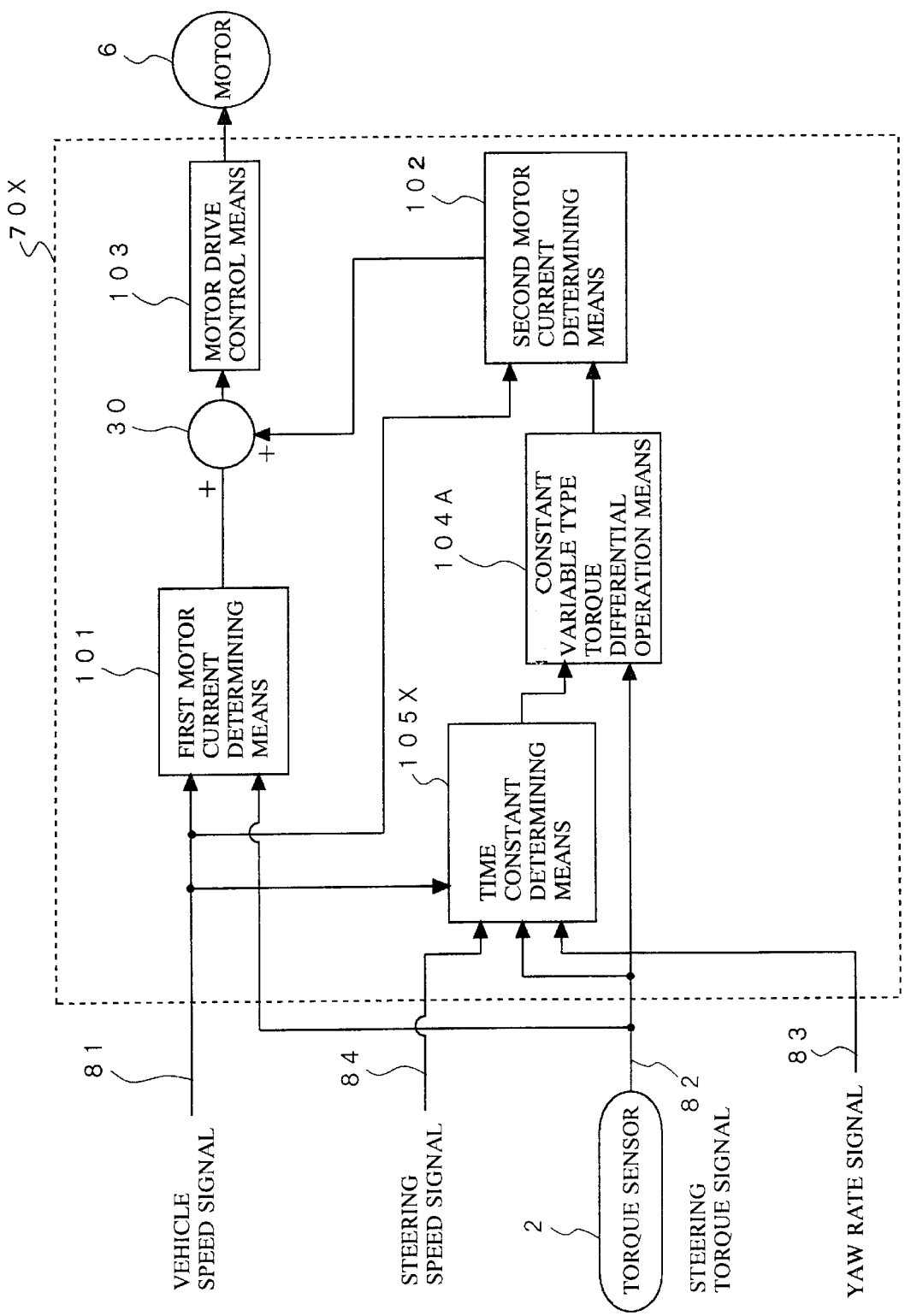
FIG. 1 is a control block diagram showing an electric power steering system according to a first preferred embodiment of the present invention.

FIG. 1 is a diagram showing an electric power steering control system according to Embodiment 1 of the present invention. In addition, in the drawings, the same reference numerals are designated to the same or like parts as in the mentioned conventional electric power steering control system, and description thereof is given briefly. In the drawing, numeral 2 designates a torque sensor mounted on a shaft of a steering wheel not shown for detecting a steering force that a driver applies to the steering wheel. Numeral 6 designates a motor for applying a steering assist force for assisting the mentioned steering force to the steering shaft of the vehicle.

Numeral 81 designates a vehicle speed signal representing a travelling speed of the vehicle (also referred to as vehicle speed). Numeral 82 designates an output signal of the mentioned torque sensor 2. Numeral 83 designates a yaw rate signal representing a yaw rate of the vehicle. Numeral 84 designates a steering rate signal representing a speed obtained when steering the steering wheel not shown by the mentioned steering apparatus. For reason of description, data represented by these four signals are hereinafter referred to as state quantity of the vehicle.

Numeral 70X designates a controller for determining a time constant in response to one to four signals out of the mentioned vehicle speed signal 81, torque signal 82, yaw rate signal 83 and steering rate signal 84, computing a steering assist amount, and driving the motor 6.

Figure 12:
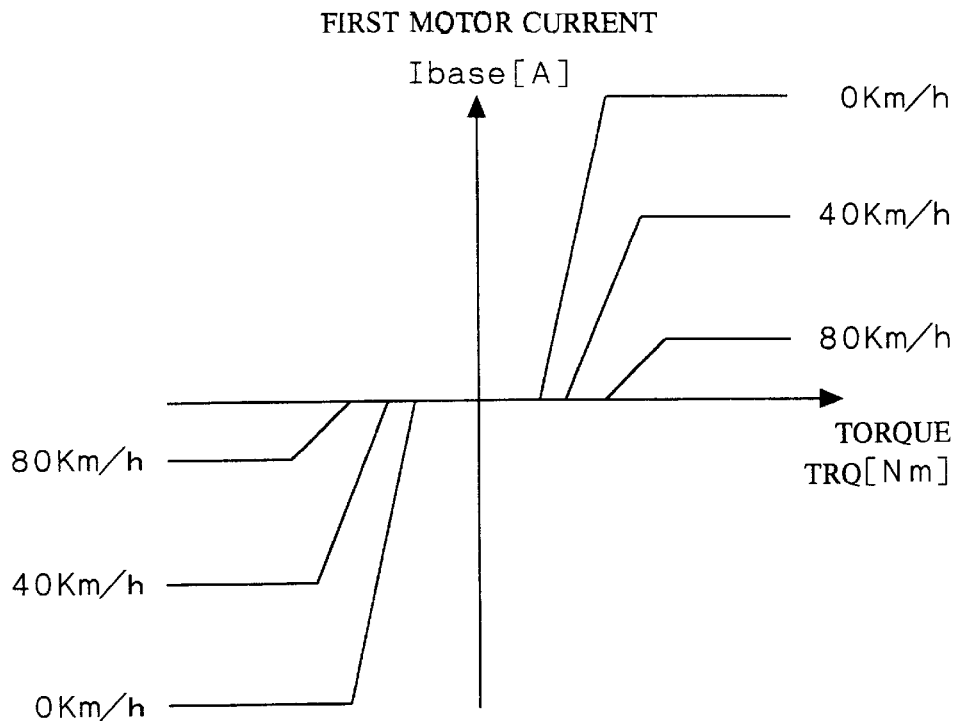
FIG. 12 is a diagram showing a characteristic of first motor current determining means in FIG. 11.

First motor current determining means 101 determines a first motor current having, for example, such a characteristic as that of the conventional system shown in FIG. 12 based on the output of the torque sensor 2 and the vehicle speed signal 81.

Second motor current determining means 102 approximately differentiates the output of the torque sensor 2 by time constant variable type torque differential operation means 104A internally provided with a differential function capable of changing a differential time constant in response to the time constant commanded from the other. Then, the second motor current determining means 102 multiplies the value of the approximate differentiation by a gain determined based on the vehicle speed signal 81, and determines a second motor current value based on, for example, such a characteristic as that of the conventional system shown in FIG. 13. Time constant determining means 105X determines the time constant based on one to four signal outputs among the mentioned four signals, and commands the obtained time constant to the time constant variable type torque differential operation means 104A.

Motor drive means 103 drives the motor 6 at a constant current establishing a sum of the first motor current and the second motor current as a target current to be passed through the motor 6.

Operation is now described. The time constant determining means 105X, based on mentioned one to four state quantities, determines the time constant of the approximate differentiation at the time constant variable type torque differential operation means 104A. This determination method will be described in detail respectively in the following preferred embodiments for each state quantity. Then, the time constant variable type torque differential operation means 104A carries out a differentiation in accordance with the time constant commanded by the time constant determining means 105X.

Any other operation except this is quite the same as that in the mentioned conventional system, and the detailed description thereof is omitted to avoid the unnecessary repetition. The first motor current determining means 101 generates an auxiliary torque assisting the steering force of the driver. In the meantime, the second motor current determining means 102 acts so as to cancel any effect on the motor 6 due to inertial moment (i.e., a feeling of the driver that he feels the inertial moment of the motor as a weight when manipulating the steering wheel). Thus the steering feeling is improved.

Furthermore, at a high speed travelling when the inertial moment of the motor 6 is a problem, the second motor current determining means 102 causes the gain, by which the approximate differentiation value of the above-described torque sensor is multiplied, to be large. On the other hand, at a low speed travelling when the torque control system becomes unstable due to the second motor current and there is a possibility that the steering torque is vibrating, the second motor current determining means 102 causes the above-described gain to be small.

Now, setting of the time constant determining means 105X is described.

The time constant determining means 105X causes the time constant of the time constant variable type torque differential operation means 104A to change in response to the variation of not less than one of the mentioned four signals. That is, number of the signal used may be any one or may be four. It is a matter of course that characteristic may be changed depending on the number of the signals being used. Therefore, individual examples will be described respectively for each signal in the later-described preferred embodiments. That is, change characteristic of the time constant with respect to the vehicle speed signal 81 will be described in Embodiment 2. Further, characteristic with respect to the torque signal 82 will be described in Embodiment 3, characteristic with respect to the yaw rate signal 83 will be described in a fourth embodiment, and characteristic with respect to the steering rate signal 84 will be described in Embodiment 4. By solely using each state quantity as shown in Embodiments 2 to 5 otherwise by using a plurality of state quantities in combination, the steering feeling can be improved.

In addition, although the time constant determining means 105X is shown as connected to all of the mentioned four signals in this Embodiment 1, it is preferable that at least one signal is connected thereto as discussed above.

Embodiment 2.

Figure 2:
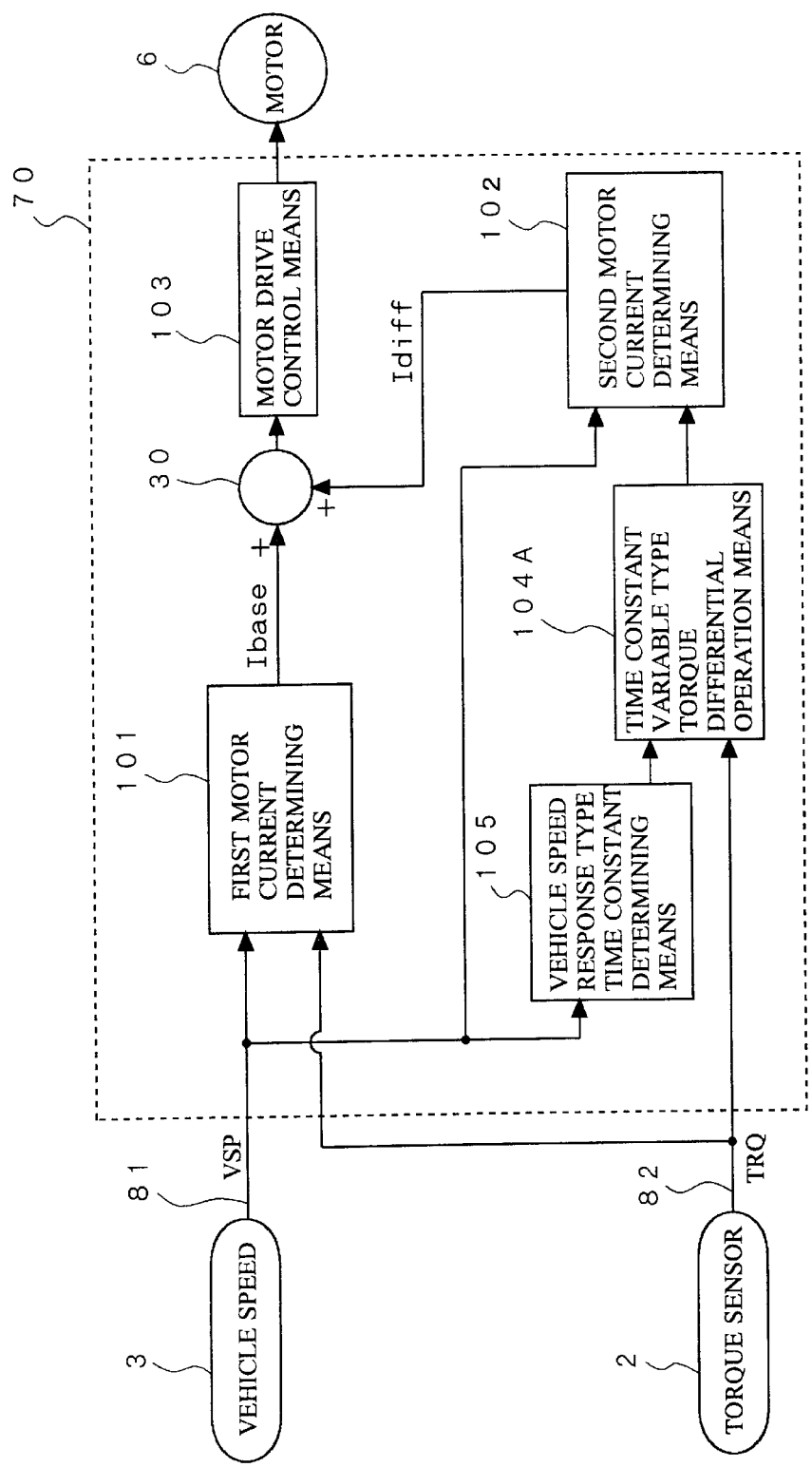
FIG. 2 is a control block diagram showing an electric power steering system according to a second embodiment of the invention.

FIG. 2 is a diagram showing an electric power steering control system according to Embodiment 2 of the invention.

In the drawing, numeral 2 designates a torque sensor mounted on the shaft of the steering wheel not shown for detecting the steering force that the driver applies to the steering wheel. Numeral 3 designates a vehicle speed sensor for detecting speed of the vehicle. Numeral 6 designates a motor for applying the steering auxiliary force assisting the mentioned steering force to the steering shaft of the vehicle. Numeral 70 designates a controller for computing the steering assist amount in response to the signal of the mentioned torque sensor 2 and vehicle speed sensor 3, and driving the motor 6.

The first motor current determining means 101 determines a first motor current having, for example, such a characteristic as that of the conventional system shown in FIG. 12 based on the output of the torque sensor 2 and the vehicle speed sensor 3.

Second motor current determining means 102 approximately differentiates the output of the torque sensor 2 by time constant variable type torque differential operation means 104A internally provided with a differential function capable of changing a differential time constant in response to the time constant commanded from the other. Then, the second motor current determining means 102 multiplies the approximately differentiated value of the torque sensor by a gain determined based on the vehicle speed signal 81, and determines a second motor current value based on, for example, such a characteristic as that of the conventional system shown in FIG. 13.

The motor 6 is driven at a constant current establishing a sum of the first motor current and the second motor current as a target current to be passed through the motor 6.

Figure 13:
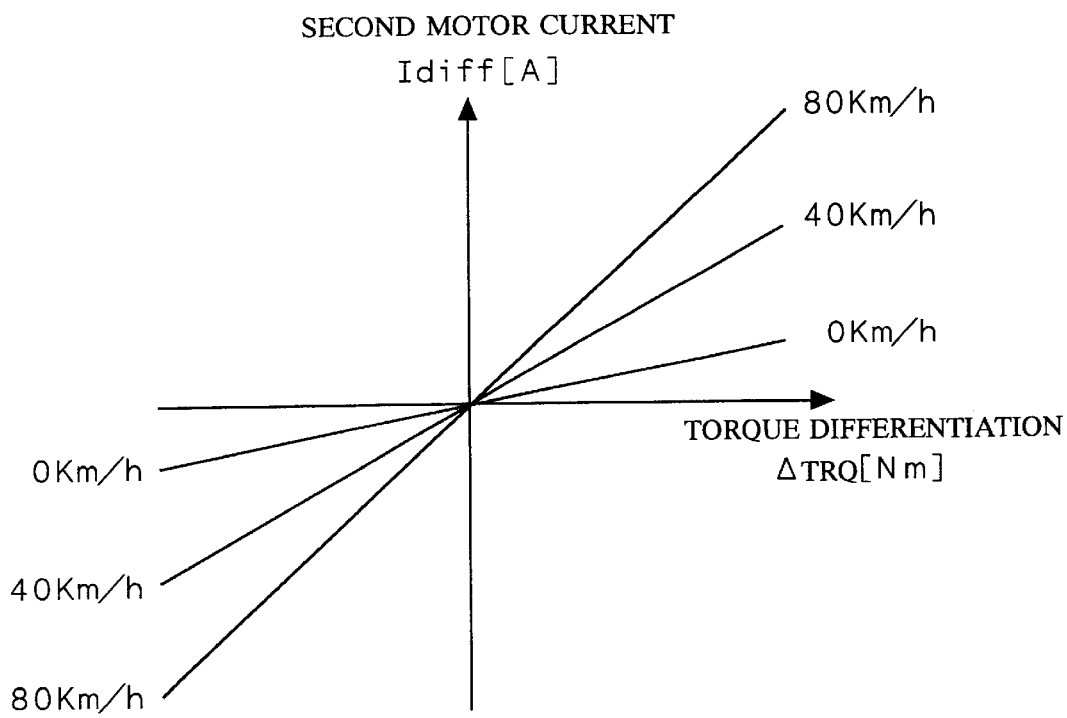
FIG. 13 is a diagram showing a characteristic of second motor current determining means in FIG. 11.
Figure 14:
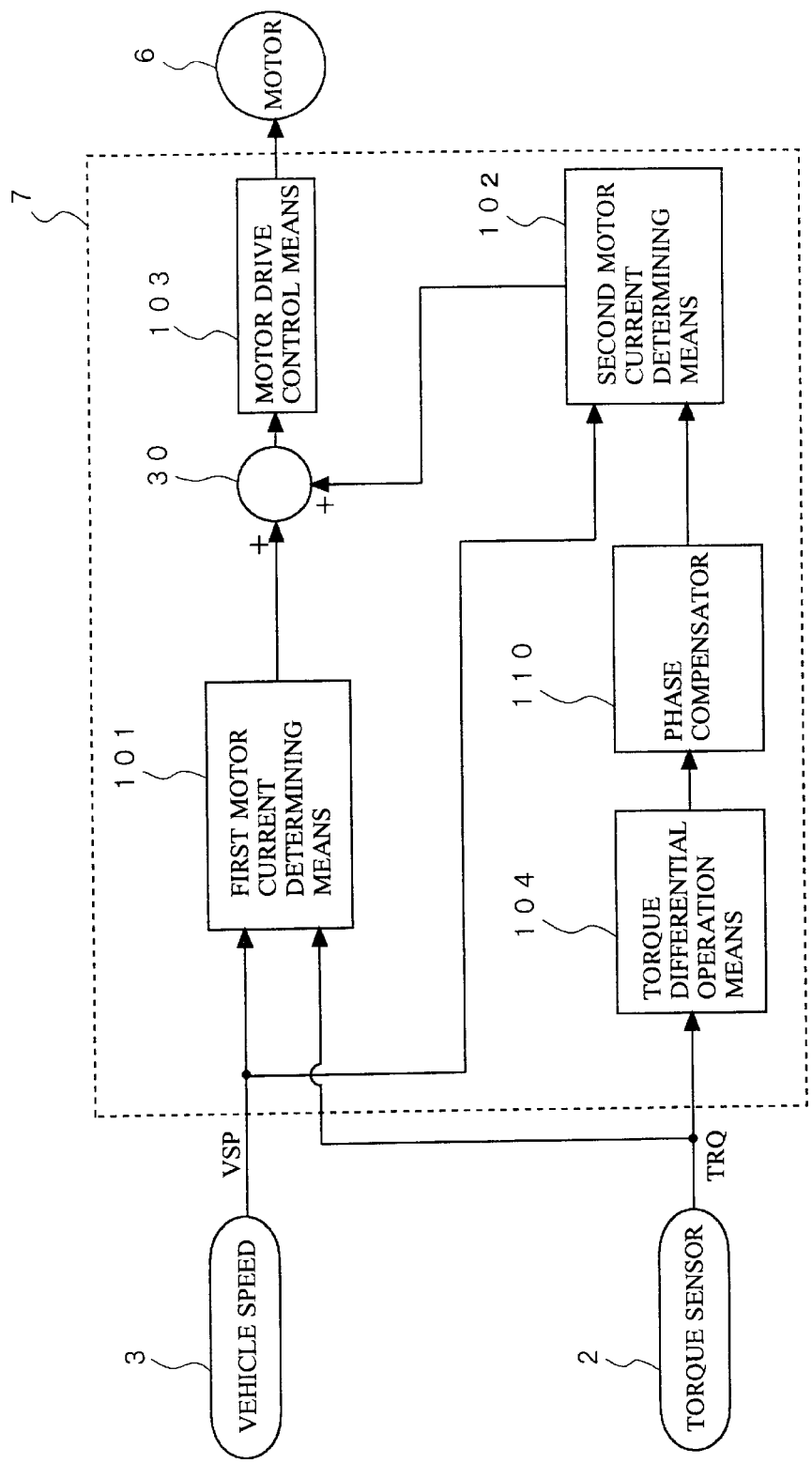
FIG. 14 is a block diagram showing an electric power steering control system according to another prior art.
Figure 15:
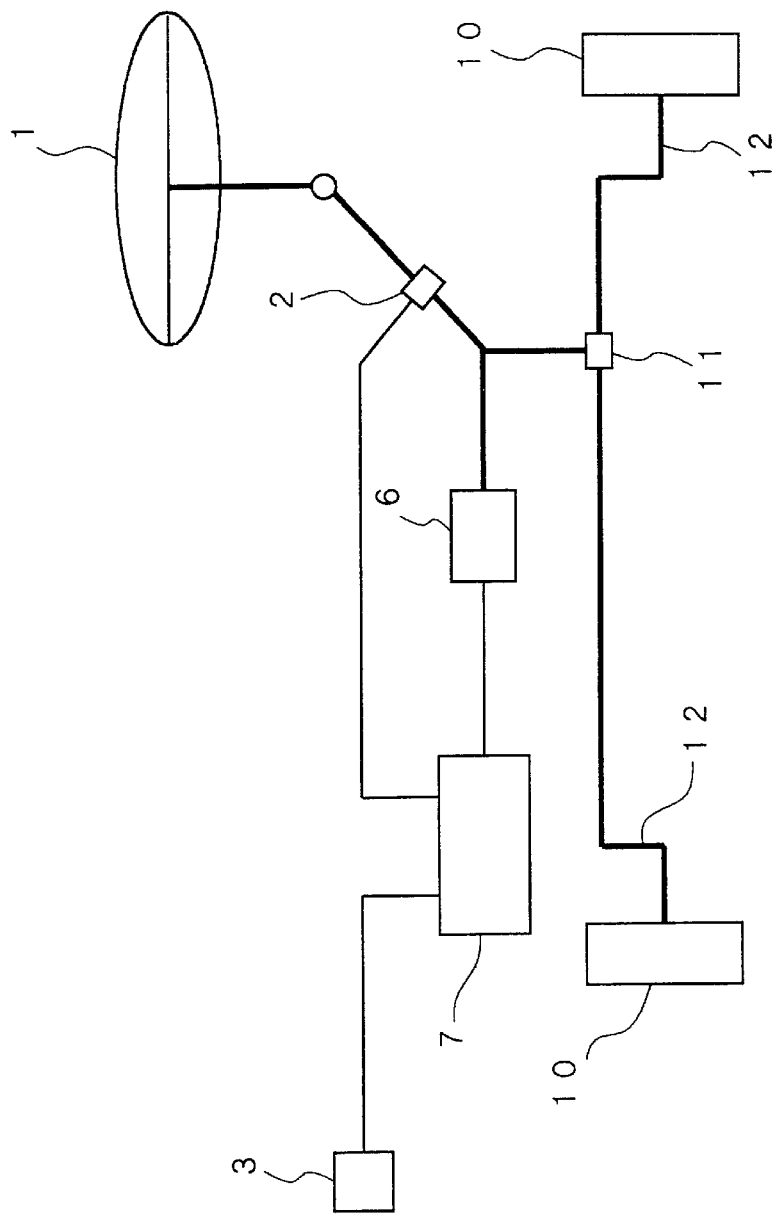
FIG. 15 is schematic diagram showing a mechanism of the electric power steering apparatus.

Note that the mentioned characteristic of FIG. 12 or 13 is shown just as one example, and it does not always mean that it must be like this.

Numeral 105 is a vehicle speed response type time constant determining means for determining, in response to the vehicle speed, the time constant of the approximate differentiation to be computed in the time constant variable type torque differential operation means 104A.

Now operation is described. The vehicle speed response type time constant determining means 105 determines the time constant of the approximate differentiation in the time constant variable type torque differential operation means 104A based on the output of the vehicle sensor 3 such that the time constant comes to be smaller as the vehicle speed becomes higher, like the characteristic shown in FIG. 3. Then, the time constant variable type torque differential operation means 104A carries out differentiation in accordance with the time constant commanded by the vehicle speed response type time constant determining means 105.

Any other operation except this is quite the same as that in the mentioned conventional system, and the detailed description thereof is omitted to avoid the unnecessary repetition. The first motor current determining means 101 generates an auxialiary torque assisting the steering force of the driver. In the meantime, the second motor current determining means 102 acts so as to cancel any effect on the motor 6 due to inertial moment (i.e., a feeling of the driver that he feels the inertial moment of the motor as a weight when manipulating the steering wheel). Thus the steering feeling is improved.

Furthermore, at a high speed travelling when the inertial moment of the motor 6 is a problem, the second motor current determining means 102 causes the gain, by which the approximate differentiation value of the above-described torque sensor is multiplied, to be large. On the other hand, at a low speed travelling when the torque control system becomes unstable due to the second motor current and there is a possibility that the steering torque is vibrating, the second motor current determining means 102 causes the above-described gain to be small.

Now, setting of the vehicle speed response type time constant determining means 105 is described in detail.

Figure 3:
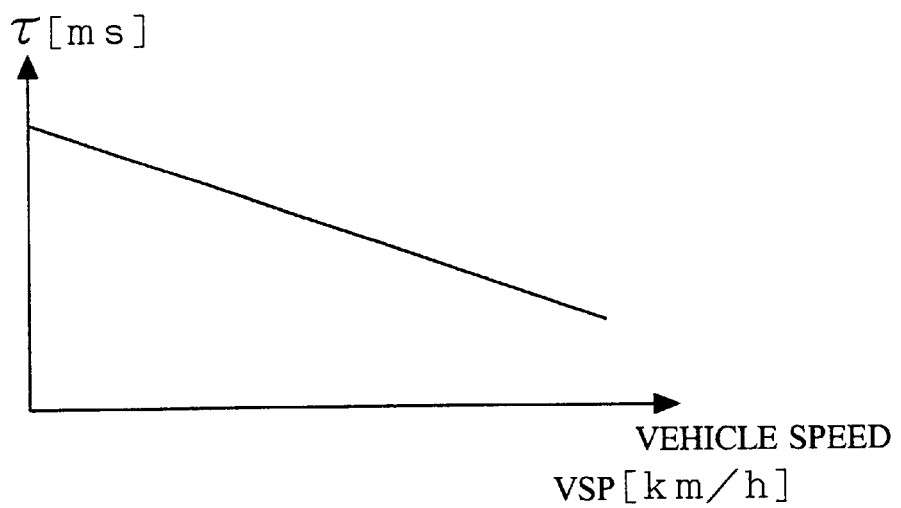
FIG. 3 is a diagram showing a characteristic of vehicle speed response type time constant determining means in FIG. 2.

The vehicle speed response type time constant determining means 105 causes the time constant of the time constant variable type torque differential operation means 104A to vary in response to the vehicle speed. For example, FIG. 3 shows an example that the time constant monotonously decreases in response to the vehicle speed. In this example, by setting the time constant to be long at a low speed travelling, a time period of the motor current flowing after there is no change in steering torque comes to be long. This increases light feel in the steering feeling. On the other hand, by causing the time constant to be gradually shorter as the vehicle speed increases, the time period of the motor current applied, e.g., after the driver releases the steering wheel, comes to be short at a high speed travelling. As a result, any unstable feel of the steering wheel does not take place, and the convergence can be improved.

In this manner, it becomes possible to achieve a steering feeling with sufficiently compensation of the inertial moment of the motor at the initial stage of turning the steering wheel, without feel of phase delay due to the second motor current, and with clear initiation of turning the steering wheel.

As a result, it becomes possible to achieve an optimum steering feeling in response to the vehicle speed by changing the time constant of the above-described approximate differentiation in response to the vehicle speed and making the time constant shorter as the vehicle speed increases.

Figure 4:
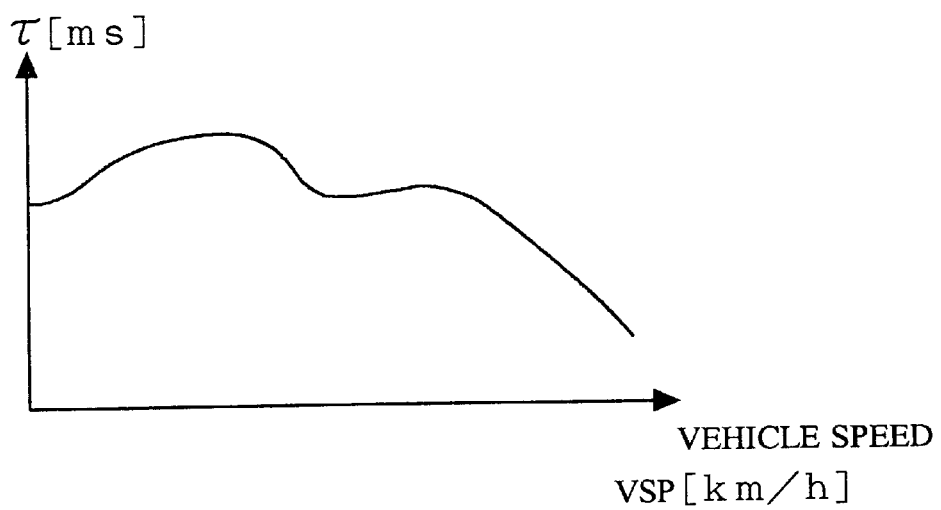
FIG. 4 is a diagram for explaining the other characteristic of the vehicle speed response type time constant determining means in FIG. 2.

In addition, FIG. 3 shows just an example according to this embodiment in which the time constant is monotonously decreased as the vehicle speed increases. Note that as far as any change takes place in response to the vehicle speed, it is preferable that the time constant decreases in a step-wise manner, not necessarily having a linear characteristic in the chart. It is also preferable that the time constant increases on the way, or that there is any part remaining unchanged on the way. For example, FIG. 4 is an example in which the time constant determining means 105 is set so as to have a nonlinear characteristic with respect to the vehicle speed. Supposing that the time constant is long at a low speed travelling as shown in FIG. 3, a light feel can be obtained upon turning the steering wheel. However, supposing that the time constant is set to be excessively long, the generated auxiliary torque will be vibrating. Therefore, in the example shown in FIG. 4, vibration is restrained by setting the time constant at an extremely low speed to be smaller than that in the region of a medium speed. Further, in the region of vehicle speed wherein there are many problems due to the effects by the inertial moment of the motor such as in slalom traveling, the time constant is set to be larger for sufficient compensation. In the high speed region, the time constant is set to be small again to decrease unstableness in the steering wheel thereby improving the convergence.

In this manner, by carrying out the setting of the optimum time constant in response to the vehicle speed, the steering feeling can be further improved.

Embodiment 3.

Figure 5:
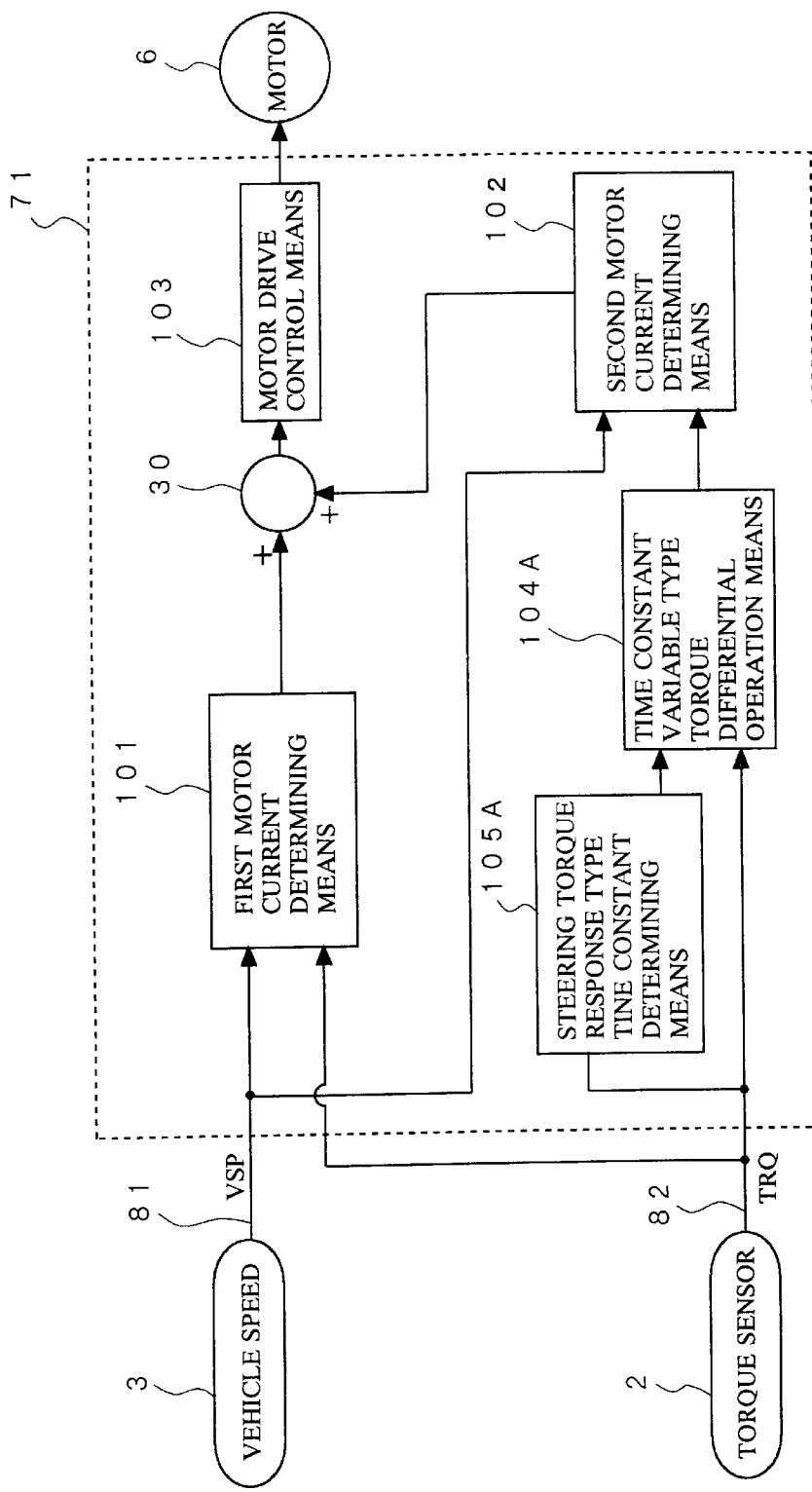
FIG. 5 is a control block diagram showing an electric power steering system according to a third embodiment.

It is preferable that the torque differential time constant is determined based on the magnitude of the steering torque 82 as described hereinafter. FIG. 5 is a diagram showing the electric power steering control system according to Embodiment 3. Numeral 71 designates a controller in this embodiment. Numeral 105A designates torque response type time constant determining means for commanding a time constant to the time constant variable type torque differential operation means 104A in response to the output of the torque sensor 2. Same reference numerals are designated to the same or like parts as those in the foregoing Embodiment 1 or 2, and description thereof is omitted.

Setting of the torque response type time constant determining means 105A in this embodiment is hereinafter described.

Generally, when angle of the steering wheel manipulation is small and force of manipulating the steering wheel is also small, the vehicle are often travelling at a high speed. Therefore, when traveling under such steering wheel manipulation angle and steering wheel torque, it is necessary to give an importance to the lowering in unstableness of the steering wheel. In other words, it is preferred that the steering wheel is set so as to be free from any unstable feel in the proximity of a neutral zone of steering. For that purpose, as the characteristic diagram shown in FIG. 6, it is preferable that the time constant of the approximate differentiation is set to be small in the proximity of the steering torque zero region. On the other hand, when setting the time constant to be large in the region where the steering torque is large, in the case that the steering torque is increased due to the effect of inertial moment of the motor, the second motor current can be applied at a large differential time constant. In this manner, the torque response type time constant determining means 105A in this embodiment sets the time constant of the torque approximate differentiation based on the output signal of the torque sensor 2.

Further, in the case that the output characteristic of the torque sensor 2 includes an individually different frequency characteristic, temperature characteristic, fluctuation or the like, the second motor current Idiff will also change likewise in response to the characteristic of the torque sensor. However, when changing the mentioned time constant of the approximate differentiation in response to the characteristic of the torque sensor 2, it becomes possible to eliminate the difference in the steering feeling due to these individual effects of the torque sensor.

Accordingly, it is preferable that the torque response type time constant determining means 105A is arranged such that the torque differential time constant in response to the characteristic of the torque sensor 2 can be set into a non-volatile memory at any production line or the like.

In this manner, by changing the above-described time constant of the approximate differentiation in response to the output of the torque sensor 2, the second motor current can be controlled in response to the steering torque. Consequently, an optimum steering feeling can be achieved.

Further, by determining the mentioned time constant of the approximate differentiation in response to the individual characteristics of the torque sensor, it is possible to eliminate the effect due to the fluctuation in the characteristic of the torque sensor.

Figure 6:
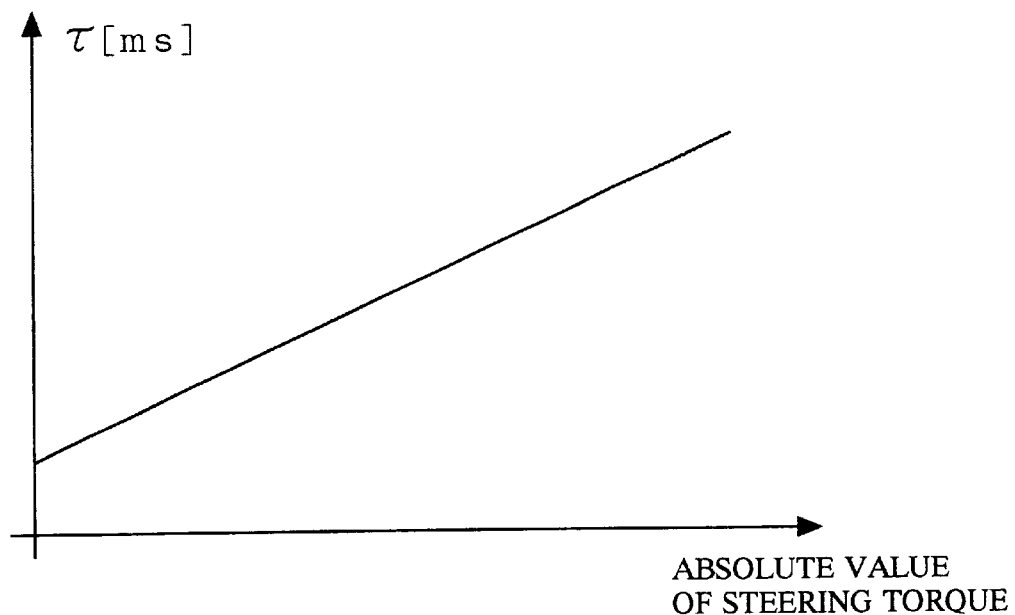
FIG. 6 is a diagram showing a characteristic of torque response type time constant determining means in FIG. 5.

The linear characteristic shown in FIG. 6 is a typical example, and it is preferable that the characteristic is a nonlinear characteristic in the same manner as in FIG. 4 in the foregoing Embodiment 2.

Embodiment 4.

Figure 7:
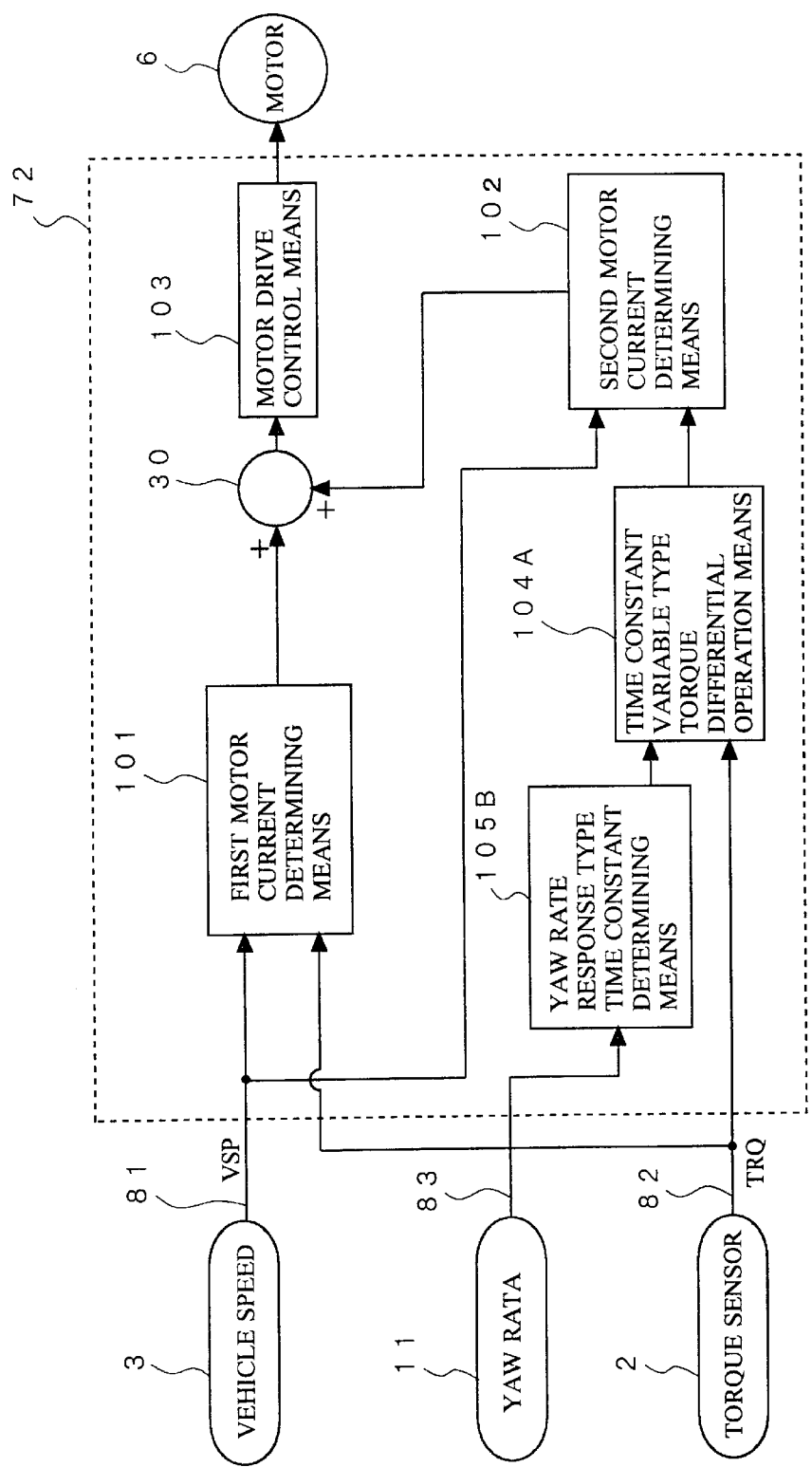
FIG. 7 is a control block diagram showing an electric power steering system according to a fourth embodiment.

It is preferable that the torque differential time constant described in the foregoing Embodiments 2 and 3 is determined based on the yaw rate of the vehicle as described hereinafter. FIG. 7 is a diagram showing the electric power steering control system according to this Embodiment 4. In the drawing, numeral 72 designates a controller, and numeral 11 designates a yaw rate sensor for detecting a yaw rate of the vehicle. The yaw rate sensor is well known and a detailed description thereof is omitted. The yaw rate can be obtained by means of an inertia sensor mounted on the vehicle body (for detecting a turning of the body), by means of a cross-wise acceleration sensor mounted on the body, or by operation (computation) from the vehicle speed and the steering wheel angle.

Numeral 105B designates a yaw rate response type time constant determining means for commanding a time constant to the time constant variable type torque differential operation means 104A in response to an output of the yaw rate sensor 11. The yaw rate response type time constant determining means 105B determines the time constant for the torque approximate differentiation from the output of the yaw rate sensor 11. Same reference numerals are designated to the same or like parts as those in the foregoing Embodiment 1 or 2, and description thereof is omitted.

Setting of the yaw rate response type time constant determining means 105B according to this embodiment is hereinafter described.

In the conventional electric power steering control system, the second motor current Idiff is determined based on the differentiation value of the torque at least directly irrespective of the yaw rate of the vehicle. Generally in the second motor current Idiff determined in such a manner, yaw rate of the vehicle is large and becomes excessively large when behavior of the vehicle is unstable the yaw rate of the vehicle is large. As a result, convergence of the vehicle body will be deteriorated.

To overcome such a disadvantage, the yaw rate response type time constant determining means 105B according to this embodiment determines the time constant of the approximate differentiation by means of the yaw rate sensor 11. For example, when yaw rate is small and the vehicle is in the stable sate like a characteristic shown in FIG. 8, increase in light feel of the steering wheel is intended. For that purpose, the time constant of the approximate differentiation is set to be large, and the second motor current is set based on the approximately differentiated value. On the other hand, when yaw rate is large and the vehicle is in an unstable behavior, the time constant of the approximate differentiation is set to be small. As a result, by same reason as the case where the torque differential time constant is set to be small at a high speed travelling in the foregoing Embodiment 2, convergence of the vehicle can be improved.

Figure 8:
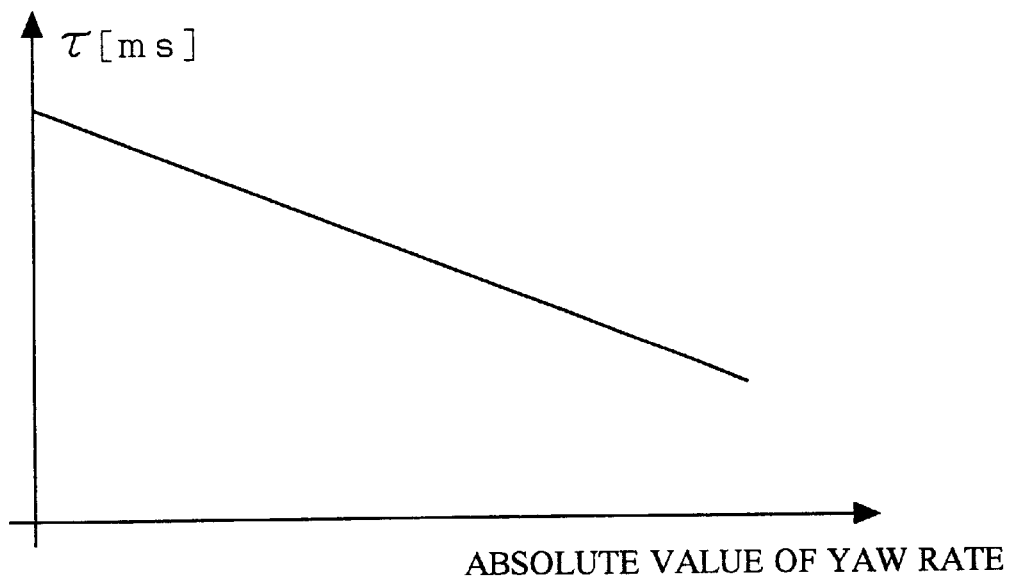
FIG. 8 is a diagram showing a characteristic of yaw rate response type time constant determining means in FIG. 7.

The linear characteristic shown in FIG. 8 is a typical example, and it is preferable that the characteristic is a nonlinear characteristic in the same manner as in FIG. 4 in the foregoing Embodiment 2.

Furthermore, it is also preferable to arrange the yaw rate response type time constant determining means 105B to be capable of responding also to the vehicle speed described in the foregoing Embodiment 2. As a result of such arrangement, it becomes possible that the second motor current based on the approximately differentiated value in response to the yaw rate is further compensated in response to the vehicle speed. Consequently, stability of the vehicle at a high speed, and optimum steering feeling in accordance with the driving conditions can be more highly achieved.

In this manner, by changing the time constant of the approximate differentiation in response to the yaw rate, the steering feeling can be compatible with the behavior stability of the vehicle.

In addition, the yaw rate is used to determine the time constant of the approximate differentiation in the foregoing description. However, as mentioned above, the similar effect will be achieved by using any state quantity for the stability in behavior of the vehicle such as vehicle speed and steering wheel angle, rotational speed and cross-wise acceleration of the vehicle body or the like, instead of the yaw rate.

Embodiment 5.

Figure 9:
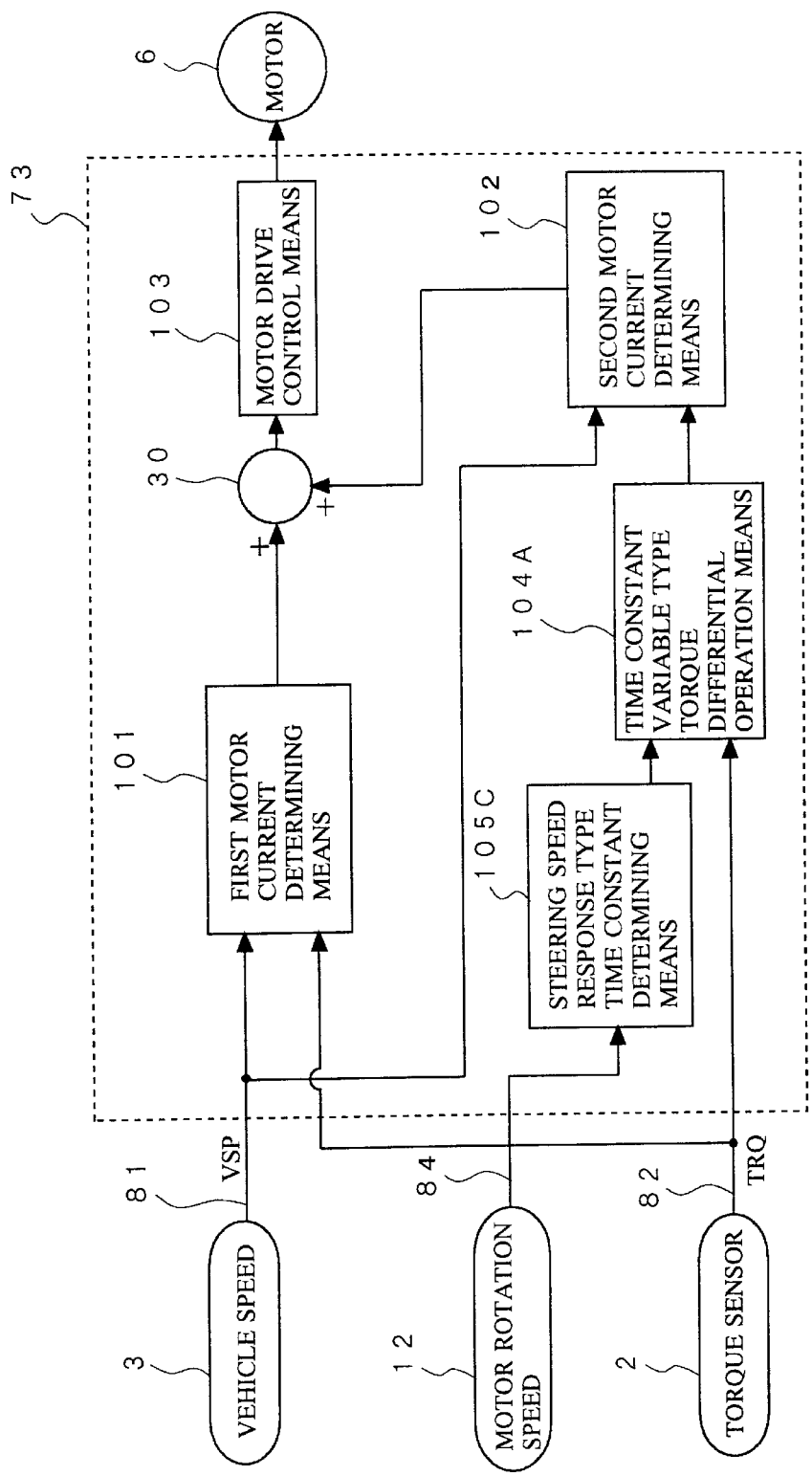
FIG. 9 is a control block diagram showing an electric power steering system according to a fifth embodiment.

In determination of the torque differential time constant based on the yaw rate described in the foregoing Embodiment 4, there arises a problem in that it is necessary to add a yaw rate sensor, any other sensor in substitution for the yaw rate sensor, or any arithmetic operation apparatus. To cope with this, as a method of obtaining the similar effect from the other sensor having been already provided, it is preferable that the torque differential time constant is determined based on the steering rate (speed of turning the steering wheel). FIG. 9 is a diagram showing the electric power steering control system according to Embodiment 5. Numeral 73 designates a controller in this embodiment. Steering rate response type time constant determining means 105C determines the time constant of the torque approximate differentiation from the output signal of the motor rotation speed sensor 12 capable of obtaining a value equivalent to the steering rate. However, in FIG. 9, for reasons of easy understanding, the description is given in the sate of also utilizing the vehicle speed signal 81. Same reference numerals are designated to the same or like parts as those in the foregoing Embodiment 4, and further description thereof is omitted.

Setting of the steering rate response type time constant determining means 105C in this embodiment is hereinafter described.

Figure 10:
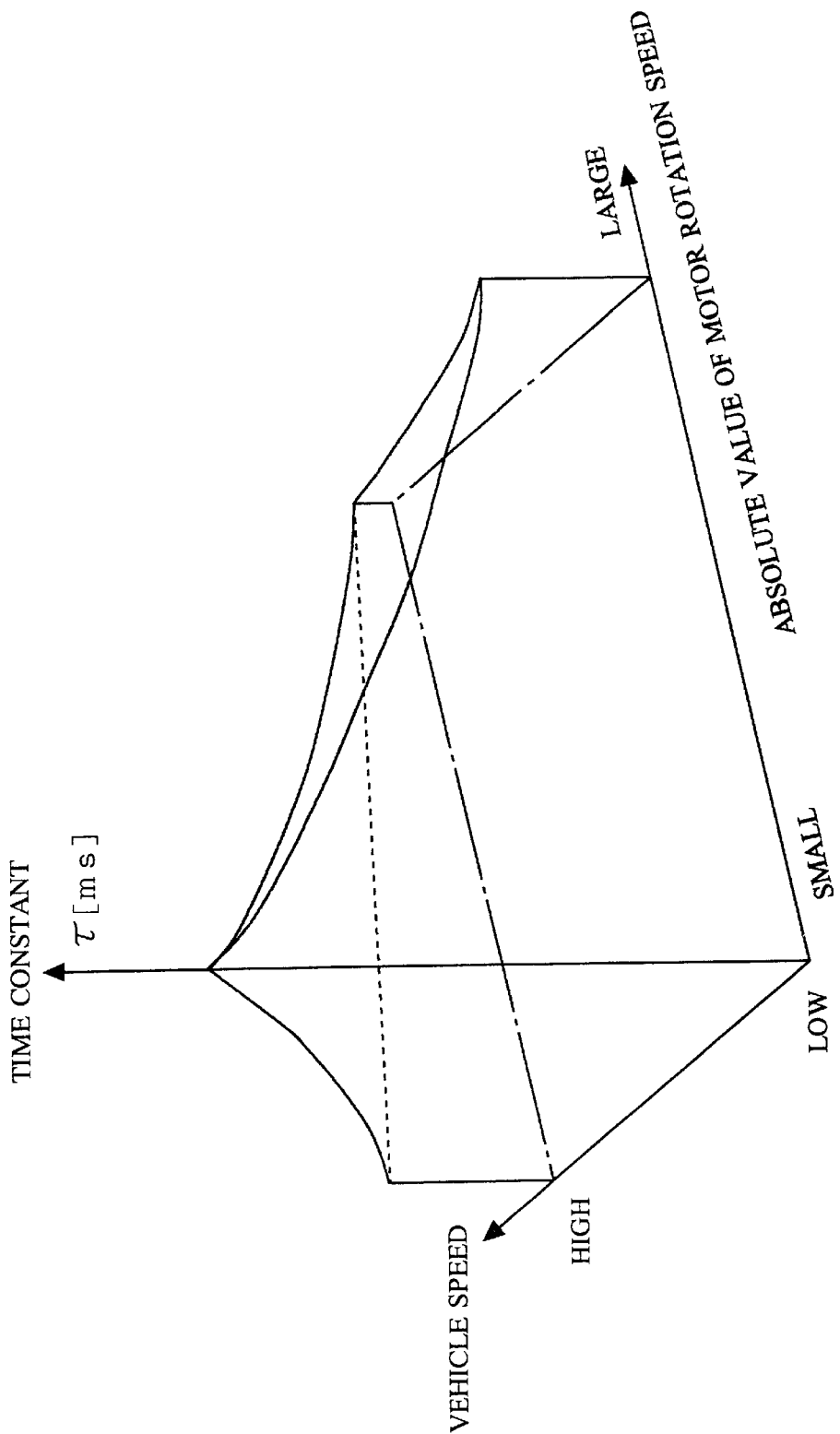
FIG. 10 is a diagram showing a characteristic of steering rate response type time constant determining means in FIG. 9.
Figure 11:
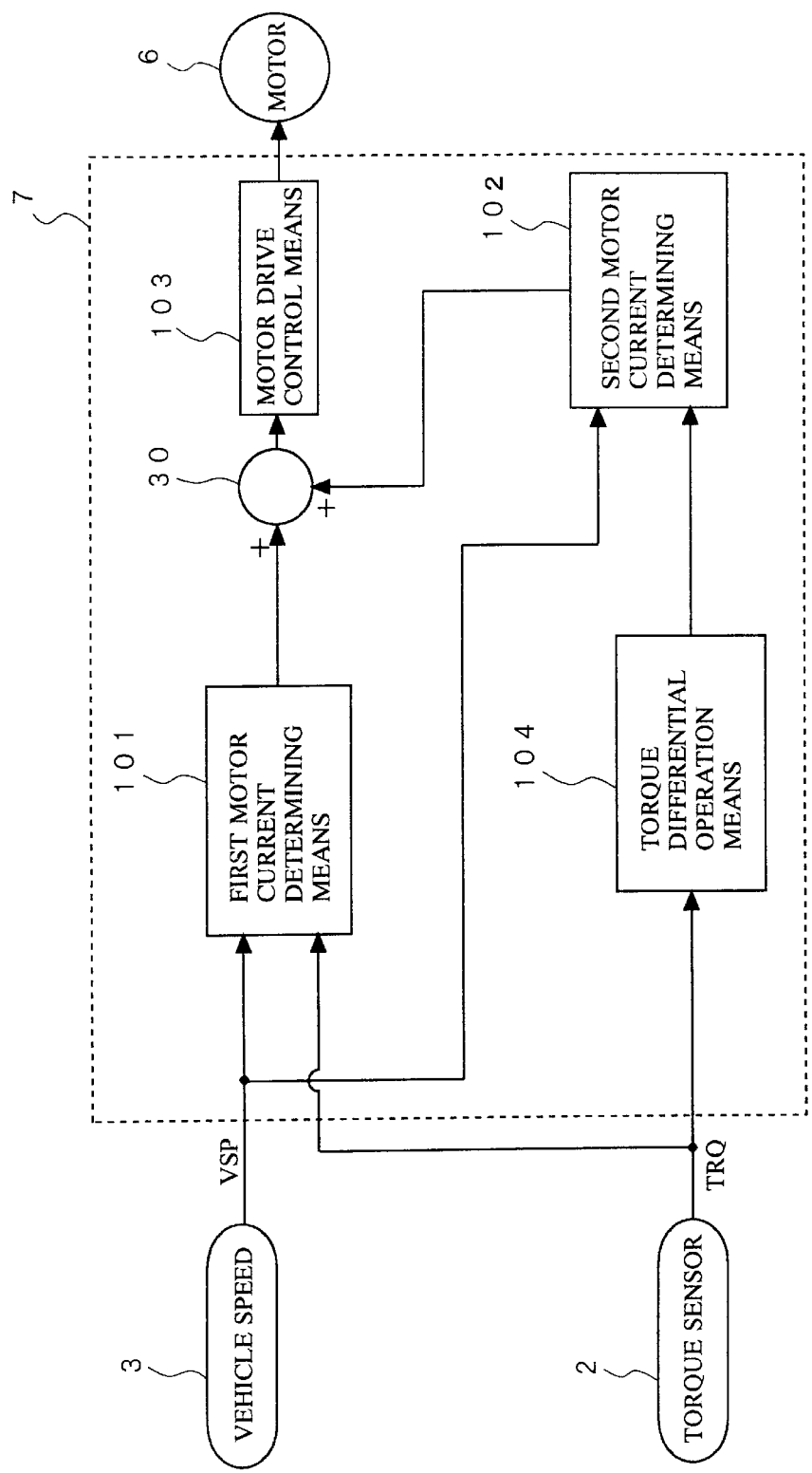
FIG. 11 is a block diagram showing an electric power steering control system according to the prior art.

Generally, when the steering rate is large in travelling at a high speed, behavior of the vehicle tends to be unstable. To cope with this, like a characteristic line shown in FIG. 10, when the vehicle speed is low, the steering rate, that is, the motor rotational speed is also small, and the vehicle is in the stable sate, it is preferable that the mentioned time constant of the approximate differentiation is set to be large, whereby the second motor current based on the approximately differentiated value is set giving an importance to a light. On the other hand, when the vehicle speed is high, the steering rate, that is, the motor revolving speed is large, and the behavior of the vehicle is in the unstable state, it is preferable that the mentioned time constant of the approximate differentiation is set to be small, whereby the convergence of the vehicle will be improved. That is, the same advantage as in the foregoing Embodiment 4 can be performed. The monotonously changing characteristic shown in FIG. 10 is a typical example, and it is preferable that the characteristic is a nonlinear characteristic in the same manner as in FIG. 4 in the foregoing Embodiment 2.

Further, the motor rotational speed is in proportion to a counter-electromotive force. Therefore in this embodiment, when computing a motor counter-electromotive force based on, for example, the following expression in substitution for the motor rotational speed, the same advantage as in the foregoing Embodiment 4 can be performed without adding any sensor to the arrangement of FIG. 2 showing Embodiment 2. As a result, cost down can be achieved.

$$Ve=Vm-Ia*Ra$$

where:
Ve: motor counter-electromotive force (V)
Vm: motor applied voltage (V)
Ia: armature current (A)
Ra: armature resistance (Ω)

Furthermore, in the case of providing with, e.g., a steering angle sensor capable of measuring a steering rate of the steering wheel, it is a matter of course that the steering angle sensor may be used. Generally, the steering angle sensor is more inexpensive than the yaw rate sensor described in the foregoing Embodiment 4. Accordingly also in this case, the cost reduction can be achieved much more than the foregoing Embodiment 4.

In addition, although it is described that the vehicle speed signal is necessarily used in this embodiment, it is not always necessary to use the vehicle speed. That is, even when arranging this embodiment such that only the signal of the motor rotational speed sensor 12 or the steering rate signal 84 is used, the same advantage can be performed.
Embodiment 6.

In the description according to the embodiments 2 to 5, the time constant determining means 105, 105A, 105B or 105C for commanding the time constant of the time constant variable type torque differential operation means 104A were respectively shown as that based on the vehicle speed in Embodiment 2, as that based on the torque in Embodiment 3, as that based on the yaw rate in Embodiment 4, and as that based on the steering rate in Embodiment 5. Any of these time constant determining means determines the time constant in response to the state quantity for the steering of the vehicle (the state quantity for the steering means a degree or level of stability in steering the vehicle). In all cases, the time constant determining means causes the differential time constant to be smaller as the state quantity increases (i.e., the stability is lowered).

Furthermore, it is also possible that the state quantity for the steering is not limited to the above-described one, but that the steering wheel angle, the acceleration of the vehicle and the like is used.

What is claimed is:
1. An electric power steering control system mounted on a vehicle that includes a steering apparatus, a torque sensor for detecting a steering force applied to said steering apparatus and a motor for assisting said steering force, said electric power steering control system comprising:

first motor current determining means for determining a first motor current value of said motor in response to an output signal of said torque sensor;

time constant variable type torque differential operation means having a differential function for differentiating the output signal of said torque sensor and capable of setting a differential time constant of said differential function to a commanded time constant;

second motor current determining means for determining a second motor current value of said motor in response to an output of said time constant variable type torque differential operation means;

time constant determining means for determining said differential time constant in response to a state quantity for the steering of said vehicle and commanding said differential time constant to said time constant variable type torque differential operation means; and motor drive control means for adding together said first and second motor currents thereby establishing a target current of said motor.

2. The electric power steering control system according claim 1, wherein said time constant determining means is vehicle speed response type time constant determining means utilizing a travelling speed of the vehicle as said state quantity for the steering of the vehicle.

3. The electric power steering control system according to claim 2, wherein in said vehicle speed response type time constant determining means said differential time constant is set to be smaller as said travelling speed of the vehicle becomes larger.

4. The electric power steering control system according to claim 1, wherein said time constant determining means is steering torque response type time constant determining means that uses said signal of the torque sensor as said state quantity for the steering of the vehicle.

5. The electric power steering control system according to claim 4, wherein in said steering torque response type time constant determining means said differential time constant is set to be larger as said signal of the torque sensor becomes larger.

6. The electric power steering control system according to claim 1, wherein said time constant determining means is yaw rate response type time constant determining means that uses a yaw rate of the vehicle as said state quantity for the steering of the vehicle.

7. The electric power steering control system according to claim 6, wherein in said yaw rate response type time constant determining means said differential time constant is set to be smaller as said yaw rate becomes larger.

8. The electric power steering control system according to claim 1, wherein said time constant determining means is steering rate response type time constant determining means that uses a steering rate of said steering apparatus as said state quantity for the steering of the vehicle.

9. The electric power steering control system according to claim 8, wherein in said steering rate response type time constant determining means said differential time constant is set to be smaller as said steering rate becomes larger.

10. The electric power steering control system according to claim 1, wherein said time constant determining means uses a plurality of state quantities selected out of said travelling speed of the vehicle, said signal of the torque sensor, said yaw rate of the vehicle and said steering rate of the steering apparatus as said state quantity for the steering of the vehicle.

* * * * *